Oct. 1, 1935.  G. A. SUCKFIELD  2,015,767
CAR CONSTRUCTION
Filed Aug. 9, 1933  3 Sheets-Sheet 1
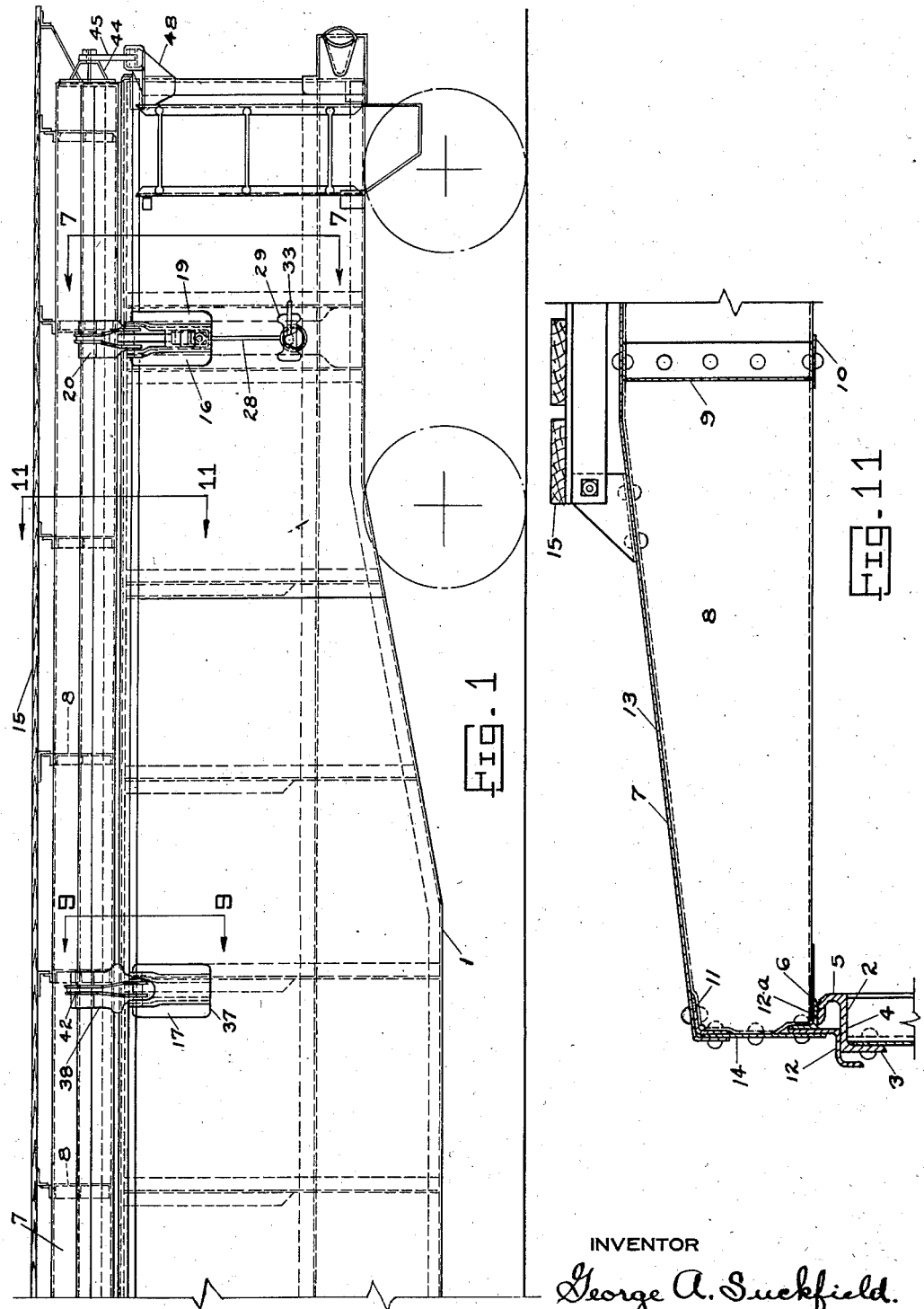
INVENTOR
George A. Suckfield.
BY
ATTORNEY

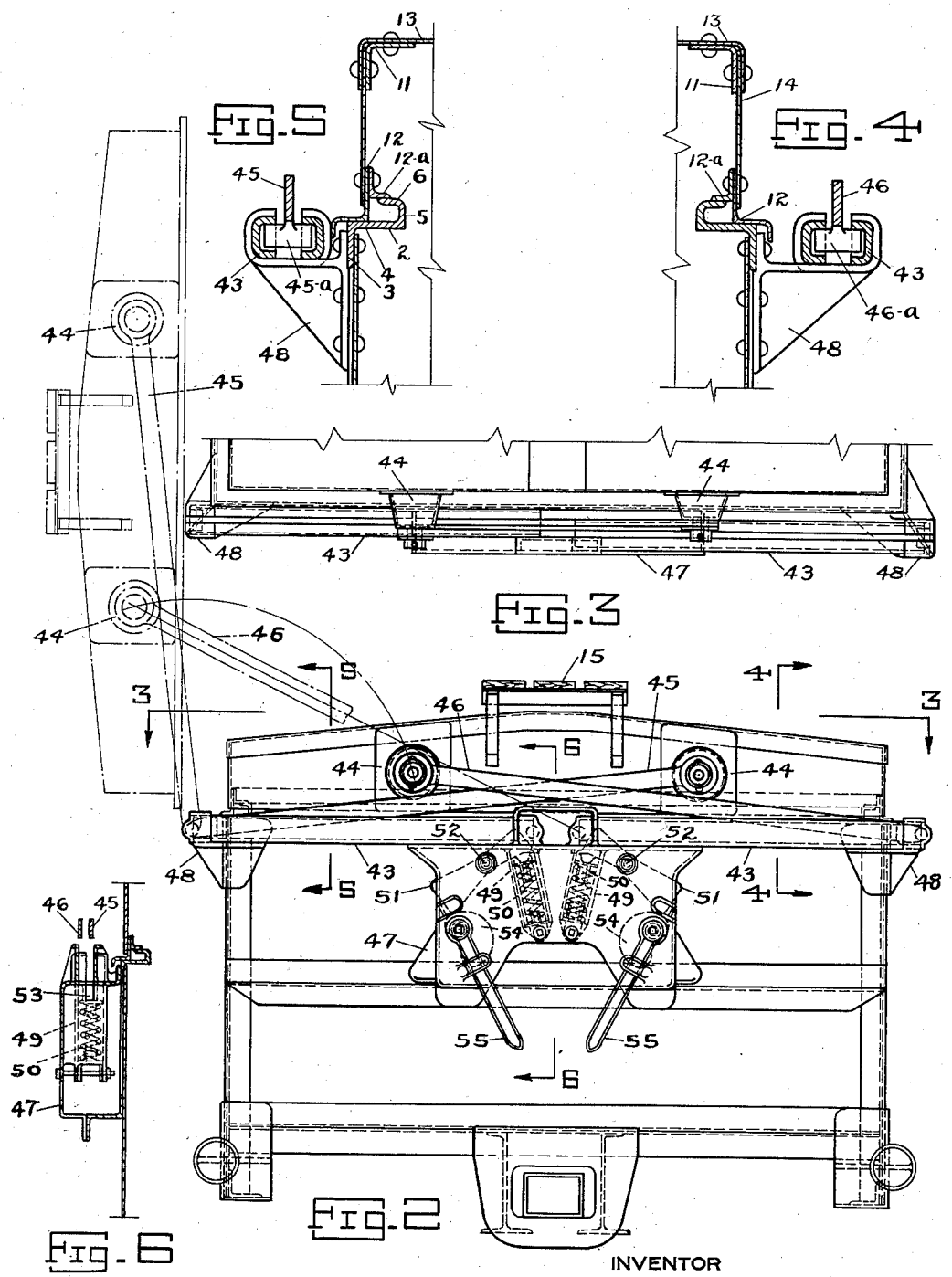

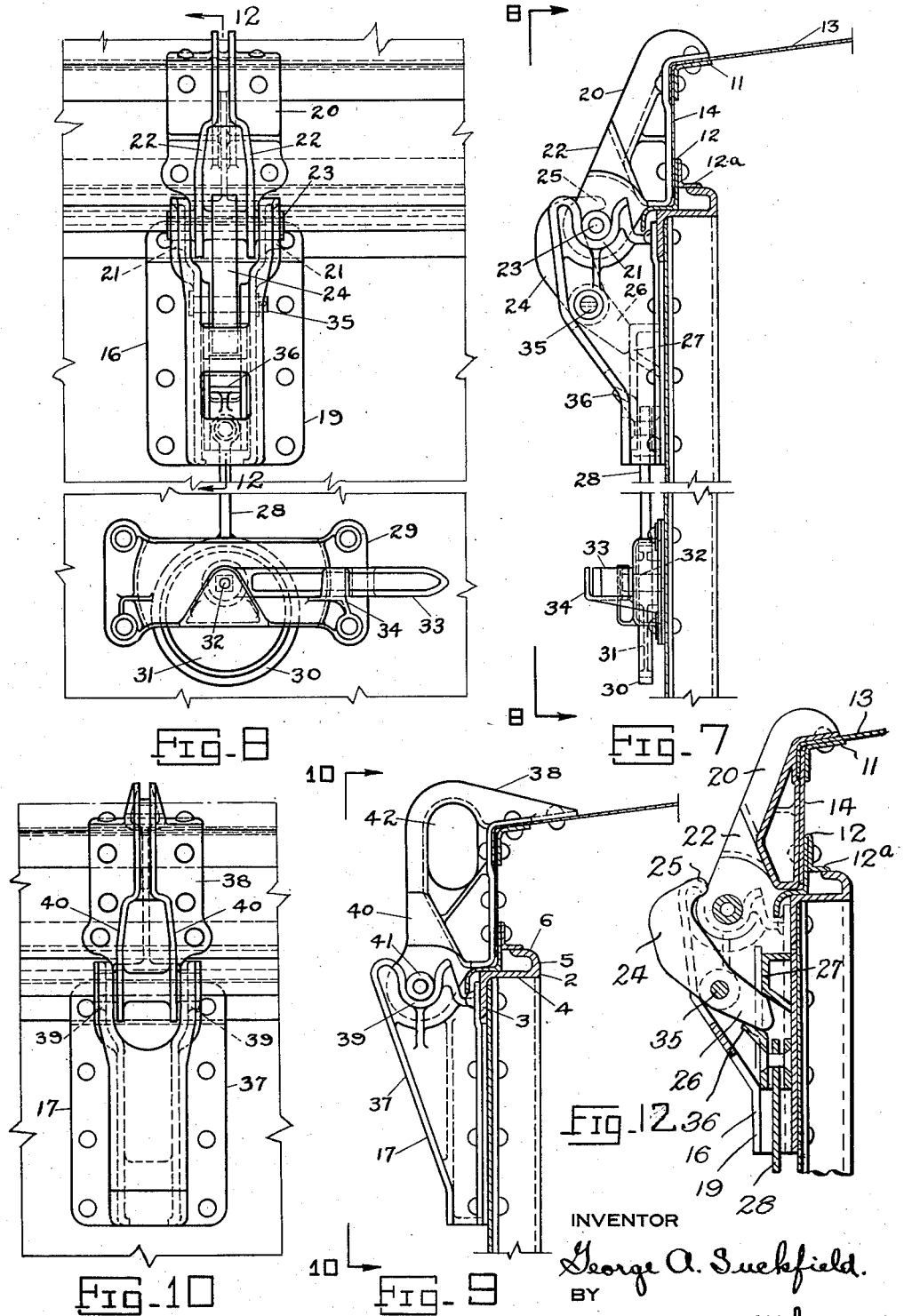

Patented Oct. 1, 1935

2,015,767

UNITED STATES PATENT OFFICE 2,015,767

CAR CONSTRUCTION

George A. Suckfield, Avalon, Pa., assignor to Pressed Steel Car Company, McKees Rocks, Pa., a corporation of New Jersey Application August 9, 1933, Serial No. 684,422

17 Claims. (Cl. 105—377)

This invention pertains to railway cars having open tops and of the type known as gondola and hopper cars. The invention pertains particularly to roofs for such cars, such roofs being readily detachable from the car and adapted to hinge about either side of the car.

Railway cars as used in freight service fall into two classes, namely house or box cars, and open top cars. The open top cars include hopper, gondola, and flat cars. Generally, when shipping lading requiring protection from the weather the box car is used, and when such protection is not necessary the open top car of the appropriate type is used.

Frequently, lading is shipped which requires protection from the weather but is too bulky or unwieldy for placing in a box car or else an open top type of car is preferable on account of the ease of loading and unloading. Many different forms of covering for open top cars have been suggested and some actually placed in service. Some have used a roof formed of separate pieces and which were assembled piece-meal upon the car and taken off in a like manner. Others split the roof longitudinally and hinged each half upon the car sides.

Each of these methods had outstanding disadvantages. When made of a purality of loose pieces considerable labor was necessary in covering and uncovering the lading and likewise the loose pieces were apt to become lost. When the roof was split longitudinally and hinged about each side of the car the upstanding halves of the roof were in the way of the loading and unloading apparatus and difficulties arose in holding the roof sections in raised position. Other methods used had disadvantages of one sort or another such as the difficulty of sealing the joint between the roof and the car and the difficulty of assembling and removing the roof from the car when the car was used first with the roof and later without the roof.

An object of the present invention is to provide a roof for an open top car which has an adequate weather seal engaging the ends and sides of the car.

Another object of the invention is to provide a roof for an open top car which is hinged to swing as a unit about either side of the car and is readily assembled upon and removed from the car.

Another object of the invention is the provision of means for positively locking the roof in closed position and providing readily releasable means which retain the roof upon the car during transit or unloading.

Another object of the invention is to provide a readily releasable and automatically engaging means to hold the roof in raised position.

These and other objects will become apparent as the description proceeds.

In the drawings forming a part of this description Fig. 1 shows in elevation a portion of an open top car equipped with the invention; Fig. 2 shows in elevation the end of a car equipped with the invention and in dot and dash lines illustrates the roof when in raised position; Fig. 3 is a plan view of a portion of the roof and car taken along the lines 3—3 of Fig. 2; Figs. 4 and 5 are sections taken on lines 4—4 and 5—5 of Fig. 2 showing details of the mechanism for holding the car roof in raised position; Fig. 6 is a section through the same mechanism on lines 6—6 of Fig. 2 illustrating the automatic locking and releasing details; Figs. 7 and 8 show side and end elevations of the locking roof hinges; Figs. 9 and 10 are views of the plain roof hinges; Fig. 11 is a section taken on lines 11—11 of Fig. 1 showing in detail the roof carlines and support for the running board. Fig. 12 shows a sectional view taken along the line 12—12 of Fig. 8 with the locking mechanism in released position.

Referring now in detail to the drawings, reference character 1 indicates an open top railway car having sides and end walls. Extending longitudinally of the side and end walls, defining the top thereof, is a member 2. This member is angular in shape, preferably having a depending flange 3 fitting over the outer side of the wall, a horizontal flange 4 disposed transversely of the wall, an inner vertical flange 5, and an outwardly turned flange 6.

The roof 7 is preferably in one piece and comprises transversely disposed carlines 8 spaced by central longitudinally disposed diaphragms 9 which are secured to opposite sides of the carlines 8. A longitudinally disposed member 10 extends beneath and connects the carlines 8 and diaphragms 9. The outer ends of the carlines 8 are connected by longitudinally disposed members 11 and 12 and the whole covered by top roof sheets 13 and side roof sheets 14. As will be observed from an inspection of the drawings the members 12 of the roof bear on the members 2 of the car side and end walls to form a rigid support for the roof. A member 12ª secured to the member 12 bears upon the flange 6 of the member 2 and combines with the member 12 in forming a support and weather seal between roof and car wall. A suitably disposed running board 15 completes the roof and meets the safety requirements. In this connection, it is obvious that the roof and running board can be split longitudinally so as to be formed in two pieces, if so desired.

At each side of the roof are hinges detachably securing the roof to the car. As shown in Fig. 1 of the drawings, the hinges 16 adjacent the ends of the car are equipped with locking devices and the intermediate hinges 17 are not equipped with locking devices but have embodied therein lifting eyes.

The hinge 16 comprises a base portion 19 secured to the car side and an upper portion 20 secured to the car roof. The upper end of the base portion 19 is bifurcated and on each of the bifurcations is formed an open topped bearing 21 for a hinge pin. Depending from the portion 20 of the hinge are spaced arms 22 having openings adjacent the lower ends thereof in which is mounted a hinge pin 23. The arms 22 fit within the bifurcated base portion of the hinge and the hinge pin is supported in the bearings 21. The arms 22 engaging the opposing faces of the bearings 21 prevent lateral displacement of the hinge portions 19 and 20 and consequently displacement of the roof with relation to the car sides.

To prevent accidental separation of the two portions of the hinge 16 under any service conditions a locking device is provided. This locking device comprises a member 24 pivotally mounted intermediate its ends on the hinge portion 19 by means of the pin 35. One end of the member 24 has a hook-shaped end portion 25 which embraces the hinge pin 23 and the other end 26 of the member 24 engages an abutment member 27 movably mounted on the hinge portion 19. Attached to the member 27 is a rod 28 which is connected to an operating mechanism mounted in a bracket 29 secured to the car side. The operating mechanism comprises a ring shaped member 30 within which is mounted a cam shaped portion 31 pivotally mounted on the bracket 29 by means of a pin 32 and a handle 33 is connected to the cam 31.

The operation of the locking device is as follows: with the parts in the relation as shown by Figs. 7 and 8 the member 24 engages the hinge pin 23 and the abutment member 27. In this position the member 24 is held fast and effectively secures the portions 19 and 20 of the hinge together. It will be observed by reference to the drawings that the member 24 when in such position as described does not interfere with the rotation of the portion 20 of the hinge upon the portion 19 but merely prevents vertical separation of the portions 19 and 20. To release the member 24 the arm 33 of the operating device is raised from the stop 34 on the bracket 29 and rotated upwardly. This movement of the arm causes a counter-clockwise rotation of the cam 31 within the ring 30 causing the ring and rod 28 to move upwardly. This upward movement of the rod 28 carries the abutment member 27 upwardly until the lip 36 on the abutment 27 engages the end 26 of the member 24. Further upward movement of the abutment member 27 rotates the member 24 in a counter-clockwise direction until the hook portion 25 of the member 24 is moved free of the hinge pin 23. In this position of the members the two parts of the hinge 19 and 20 may be separated in a vertical direction.

The intermediate hinges of the car comprise a base portion 37 secured to the car side and a portion 38 secured to the roof. The portion 37 is bifurcated similarly to the portion 19 and has bearings 39 on each of the bifurcations. The portion 38 has depending arms 40 extending within the bifurcation and a hinge pin inserted adjacent the lower ends of the arms 40, which hinge pin 41 is supported in the bearings 39. No locking device is provided on the hinges 17 but the portion 38 of the hinge has incorporated therein a lifting eye 42 which may be engaged by any suitable device for raising the roof, it being understood that duplicate hinges 16 and 17 are disposed on opposite sides of the car and when it is desired to raise the roof about the left side of the car by rotation upon its hinges the locking devices on the hinges 16 at the right side only of the car need be released and a suitable mechanism is engaged in the eyes 42 of the hinges 17 on the right side of the car to raise the roof which pivots upon the hinge pins 23 in the hinges 16 on the left side of the car.

Referring now to Fig. 2 of the drawings in which is illustrated an end view of the car and a means for retaining the roof in raised position, which position is illustrated in dot and dash lines. This means comprises a track 43 disposed transversely of the end wall of the car adjacent the top thereof. On each side of the vertical center line of the end of the car are suitably disposed bearings 44 secured to the roof and pivotally mounted on these bearings are the arms 45 and 46, the free ends of the arms 45 and 46 terminating in transversely disposed portions 45ᵃ and 46ᵃ engaging the track 43. Referring now to Figs. 2, 4 and 5 of the drawings, it will be observed that the track 43 is in two sections, the inner ends of the track sections terminating short of the vertical center line of the end of the car and secured to a bracket 47 disposed on the vertical end wall of the car. The outer ends of the track sections are supported in suitably formed brackets 48 which are shown in the drawings as combined corner caps and track supports. It will be observed that the brackets 48 extend the ends of the track slightly beyond the sides of the car and substantially in line with the hinge pin bearings at each side of the car. As illustrated in Figs. 4 and 5 the sections of the track 43 embrace the ends of the arms 45ᵃ and 46ᵃ and have a slotted opening in the top to permit passage of the arms 45 and 46. Mounted within the bracket 47 is a suitable device for retaining the roof in raised position when pivoted about either side of the car.

Referring now to Figs. 2 and 6 of the drawings suitably disposed pockets 49 are mounted in the bracket 47 adjacent each side of the center line and disposed within the pockets are compression springs 50. On each side of the vertical center line of the end of the car and within the bracket 47 are members 51 pivotally mounted intermediate their ends on pins 52. One end of the member extends within a slot 53 of the pocket 49 and engages the spring 50, the opposite end of the member 51 engaging a cam shaped abutment member 54 pivotally mounted within the bracket 47. As will be observed from Figs. 2 and 6, the inner ends of the sections of the track 43 have slots registering with the slots 53 of the spring pockets 49 and one end of the member 51 extends within the track sections as illustrated. With the cam shaped abutments 54 in the position shown in Fig. 2 of the drawings the members 51 can rotate to compress the springs 50 but are prevented from rotating in the opposite direction by the cams 54. Attached to each cam 54 is an operating handle 55 and it will be observed that when the handle 55 is rotated upwardly the face of the cam rotates the member 51 to compress the spring 50 and move the member 51 within the slot in the spring pocket and entirely free of the slot in the track sections 43 for a purpose which will be hereinafter described.

With the roof in position as shown in full lines on Fig. 2 and it is desired to rotate the roof about its hinges on the left side of the car as previously described, the following action takes place. It will be observed that when the roof is closed the ends of the members 45 and 46 rest in the outer ends of the track sections 43. When the roof is rotated about the hinges on the left side of the car the arm 45 remains in fixed relation to the roof and pivoting about the outer ends of the track section in the bracket 48 on the left side of the car. The arm 46 pivoting on the bracket 44 moves inwardly of the car in the track 43 until the end of the arm engages the member 51. Further movement of the arm 46 moves the member 51 down into the spring pocket 49 and compresses the spring 50. As the arm 46 passes over the member 51 to the inner end of the track sections 43, the spring 50 moves the member 51 upward within the track sections 43 and behind the end of the arm 46. This position of the arm 46 and the roof is shown in dot and dash lines on Fig. 2. It will be obvious, therefore, that inasmuch as the member 51 on the right side of the car is prevented from rotating in a clock-wise direction by reason of the cam 54, the member 51 serves as an abutment to hold the arm 46 in the position shown in dot and dash lines, retaining the roof in raised position. When it is desired to lower the roof the handle 55 on the right side of the car is rotated upwardly which moves the attached cam 54 to impart a counter-clockwise movement to the member 51 and as the member 51 moves out of the slot in the track sections 43 the arm 46 can move outwardly of the car permitting the roof to be lowered. It is to be understood that a track and its cooperating mechanism is mounted on each end of the car so as to provide suitable supports for the roof when in raised position.

It will be obvious to one skilled in the art that many changes may be made in the details of the invention herein described without departing from the scope of the appended claims. Several contemplated changes would be in the details of the track and the abutment members 51 yet retaining the idea of a guide for the arms 45 and 46 having a stop limiting inward movement of the arms and a movable abutment engaging behind the end of the arms to retain the roof in raised position. When the roof is adapted to be pivoted about either side of the car it will be necessary to have both arms such as 45 and 46, whenever the roof is pivoted about one side of the car but one of the arms would be necessary and their cooperating mechanism. Obviously, with hinges and hinge locking devices as described the arm which does not move relative to the roof during the time the roof is being raised, such as the arm 45 illustrated in Fig. 2, serves no useful purpose; however, when locking devices are omitted from the hinges the arm 45 would serve as an additional guide for the roof and to assist in retaining the roof in position upon the car. It will also be obvious that many changes can be made in the design of the roof and the hinges. It is preferable, however, to retain bearings for the hinge pins such as described so as to permit the roof to be readily assembled and removed from the car with a minimum of effort. The locking devices described are useful during the time the car is in transit as well as when the car roof is being raised, to retain the roof upon the car. The lifting eyes may be made separate from the hinges, if desired. Many suitable forms of devices for operating the hinge lock may be used.

Having thus described the invention what I claim as new and desire to secure by Letters Patent is:

1. An open top railway car having in combination, a one piece roof for closing said open top, a hinge at each side of said roof and connected to a carside wall, and a member connected to the roof at each side of the longitudinal center line of the car, each of said members being connected to the car end wall at the opposite side of the longitudinal center line of the car, said roof being adapted to be raised upon either of said hinges and held in raised position by said member connected to the opposite side of the car.

2. An open top railway car having a one piece roof detachably mounted thereon and adapted to pivot about either side of the car upon hinges secured to the roof and car side walls, in combination, a locking member secured to one of said side wall hinge portions selectively engaging the portion of said hinge secured to the car roof, and a readily releasable member securing the locking member in engaging position.

3. An open top railway car having a one piece roof detachably mounted thereon and adapted to pivot about either side of the car in a vertical direction upon two piece hinges secured to either side of the roof and the adjacent car side wall, in combination, a device at an end of the car cooperating with the car end wall to retain the roof in a raised position, said device comprising a track disposed transversely of the car, stops on the track adjacent each side of the vertical center line of the car end wall and a member connected to the track at each side of said vertical center line and connected to the roof at the opposite side of said center line.

4. An open top railway car having a one piece roof closing the top opening and pivotally mounted to each car side wall by a two piece hinge secured to the roof and car wall, in combination, an angular member secured to the top of the car side and extending substantially the length of the roof, a horizontally disposed flange on said member, a vertical flange on the inner edge of said horizontal flange, extending above said car and having an outwardly turned end portion, and longitudinally disposed members secured to said roof adapted to engage said horizontal flange and outwardly turned end portion.

5. An open top railway car having a one piece roof closing the opening, in combination, a two piece hinge at each side of the car secured to the roof and car side respectively, a trunnion secured to the roof portion of the hinge, a bearing for said trunnion embodied in the car wall portion of the hinge, a member pivotally mounted adjacent the bearing and adapted to engage the trunnion to prevent separation of trunnion and bearing, an abutment movably mounted upon the wall hinge, adapted to hold said member in engagement with the trunnion and to release the member from the trunnion.

6. An open top car having a roof closing the opening and hinged to each side of the car for selective pivoting about either side to permit access to the interior of the car, in combination, a track disposed transversely of one end of the car, a slot in said track extending from adjacent the outer end of the track to adjacent the vertical center line of the car, a roof supporting member pivoted at one end adjacent a side of the roof and extending across the car to adjacent the opposite side of the roof, said member seating within said slot, a member pivotally mounted on the car and seating within the track adjacent the inner end of said slot, resilient means resisting downward rotation of said member, and a stop selectively resisting upward rotation of the member, said roof supporting member being adapted to seat behind said latter member and within the slot when the roof is rotated about one side of the car and to pivot within the slot adjacent the outer end thereof when the roof is pivoted about the opposite side of the car.

7. An open top car body having a roof for closing the opening, in combination, a hinge at each side of the car about which the roof is raised, a track disposed transversely of the end of the car end wall, a support pivotally connected to the roof and engaging the track a corner cap on the car, and a slotted box shaped projection formed on the corner cap, said projection forming an end wall of the said track.

8. An open top railway car having a one-piece roof closing the opening, in combination, a two-piece hinge at each side of the car secured to the roof and car side respectively, a trunnion secured to the roof portion of the hinge, a bearing for said trunnion in the car wall portion of the hinge, a member pivotally mounted adjacent the bearing and adapted to engage the trunnion to prevent separation of trunnion and bearing, an abutment movably mounted upon the wall hinge, said abutment having a portion adapted to hold said member in engagement with the trunnion and a lip adapted to release the member from the trunnion.

9. An open top railway car having a one-piece roof closing the opening, in combination, a two-piece hinge at each side of the car secured to the roof and car side respectively, a trunnion secured to the roof portion of the hinge, a bearing for said trunnion embodied in the car wall portion of the hinge, a member pivotally mounted adjacent the bearing and adapted to engage the trunnion to prevent separation of trunnion and bearing, an abutment adapted to hold said member in engagement with the trunnion and to release the member from the trunnion and an operating mechanism connected to the abutment adapted to move said abutment within the car wall portion.

10. An open top railway car having a one-piece roof closing the opening, in combination, a two-piece hinge at each side of the car secured to the roof and car side respectively, a trunnion secured to the roof portion of the hinge, a bearing for said trunnion embodied in the car wall portion of the hinge, a member pivotally mounted adjacent the bearing and adapted to engage the trunnion to prevent separation of trunnion and bearing, an abutment adapted to hold said member in engagement with the trunnion and to release the member from the trunnion, and a cam-shaped operating mechanism pivotally mounted beneath the car wall portion and connected to the abutment adapted to move said abutment within the car wall portion.

11. An open top railway car having a one-piece roof detachably mounted thereon and adapted to pivot about either side of the car, a track disposed transversely of one end of the car, a bracket secured to the end wall at the vertical center line thereof adapted to support said track, roof supporting members pivotally connected to the roof on opposite sides of the center line of the car and extending across the car to opposite sides thereof, said members being adapted to engage the track.

12. An open top railway car having a one-piece roof detachably mounted thereon and adapted to pivot about either side of the car, in combination, a track disposed transversely of one end of the car having a slotted opening therein, a bracket secured to the end wall adapted to support said track, roof supporting members pivotally connected to the roof on opposite sides of the vertical center of the car and extending across the car to opposite sides thereof, said members seating within said slot and adapted to engage the track.

13. An open top railway car having a one-piece roof detachably mounted thereon and adapted to pivot about either side of the car, in combination, a track disposed transversely of one end of the car, a bracket secured to the end wall adapted to support said track, roof supporting members pivotally connected to the roof on opposite sides of the center line of the car and extending across the car to opposite sides thereof and engaging the track, and means within said bracket adapted to engage the roof supporting member when the roof is in raised position.

14. An open top railway car having a one-piece roof detachably mounted thereon and adapted to pivot about either side of the car, in combination, a track disposed transversely of one end of the car, a bracket secured to the end wall adapted to support said track, roof supporting members pivotally connected to the roof on opposite sides of the center line of the car and extending across the car to opposite sides thereof and engaging the track, and a member pivotally mounted within the bracket adapted to extend within the track to engage the roof supporting member when the roof is in raised position.

15. An open top railway car having a one-piece roof detachably mounted thereon and adapted to pivot about either side of the car, in combination, a track disposed transversely of one end of the car, a bracket secured to the end wall adapted to support said track, roof supporting members pivotally connected to the roof on opposite sides of the center line of the car and extending across the car to opposite sides thereof and engaging the track, a member pivotally mounted within the bracket extending into the track to engage the roof supporting member when the roof is in raised position and a resilient means maintaining the pivotally mounted member in engaging position.

16. An open top railway car having a one-piece roof detachably mounted thereon and adapted to pivot about either side of the car, in combination, a track disposed transversely of one end of the car, a bracket secured to the end wall adapted to support said track at the vertical center line of the car, a corner cap having a projection adapted to support the track adjacent the sides of the car, roof supporting members pivotally connected to the roof on opposite sides of the vertical center of the car and extending across the car to opposite sides thereof, said members adapted to engage the track.

17. In a railway car, a body having side and end walls, an angular member defining the top of each wall and comprising a portion secured to the wall in the plane thereof, a horizontal portion overlying the wall, said latter portion ending in an upwardly directed re-entrant flange, a roof for said body being supported on said horizontal portions of said roof members, an inwardly directed flange on said roof overlapping said re-entrant flanges to form a weather seal.

GEORGE A. SUCKFIELD.